United States Patent [19]

Yokouchi

[11] Patent Number: 4,783,098
[45] Date of Patent: Nov. 8, 1988

[54] SEAT BELT DEVICE FOR USE IN A MOTOR VEHICLE

[75] Inventor: Takahito Yokouchi, Higashihiroshima, Japan

[73] Assignee: Mazda Motor Corporation, Hiroshima, Japan

[21] Appl. No.: 69,601

[22] Filed: Jul. 2, 1987

[30] Foreign Application Priority Data

Jul. 7, 1986 [JP] Japan .................. 61-160121

[51] Int. Cl.⁴ ............................................. B60R 22/26
[52] U.S. Cl. ................................... 280/801; 280/808; 297/481
[58] Field of Search ............... 280/801, 804, 806, 802, 280/808; 297/469, 481, 483, 468, 473

[56] References Cited

U.S. PATENT DOCUMENTS

| | | | |
|---|---|---|---|
| 4,405,155 | 9/1983 | Matsuoka | 280/808 |
| 4,465,302 | 8/1984 | Miki et al. | 280/808 |
| 4,496,170 | 1/1985 | Sasaki et al. | 280/801 |
| 4,531,762 | 7/1985 | Sasaki et al. | 280/801 |
| 4,573,709 | 3/1986 | Kawai et al. | 280/801 |
| 4,575,119 | 3/1986 | Okuhara et al. | 280/801 |
| 4,583,762 | 4/1986 | Carlstedt | 280/801 |
| 4,635,963 | 1/1908 | Higuchi et al. | 280/801 |
| 4,667,980 | 5/1987 | Yamamoto | 280/801 |
| 4,682,789 | 7/1987 | Higuchi et al. | 280/801 |
| 4,684,153 | 8/1987 | Miller | 280/808 |

FOREIGN PATENT DOCUMENTS 58-35443 3/1983 Japan .

*Primary Examiner*—Richard A. Bertsch
*Attorney, Agent, or Firm*—Burns, Doane, Swecker & Mathis

[57] ABSTRACT

A seat belt device for use in a motor vehicle which internally accommodates front and rear seats and in which the getting on and off the rear seat is executed after the front seat has been shifted frontwards through operation of an operating member disposed on the front seat to shift the front seat back and forth, with a securing point where the seat belt is secured to the vehicle body being provided at the side portion of a seat cushion of the front seat. The securing point of the seat belt is disposed freely reciprocably in the longitudinal direction of the motor vehicle so as to be shifted backwards in association with the operation of the operating member.

17 Claims, 6 Drawing Sheets

SEAT BELT DEVICE FOR USE IN A MOTOR VEHICLE

BACKGROUND OF THE INVENTION

The present invention generally relates to a seat belt device for use in a motor vehicle and more particularly, to a seat belt device for a front seat provided in a motor vehicle, in which the getting on and off a rear seat is executed after the front seat has been shifted frontwards and a securing point where the seat belt of the front seat is secured to a vehicle body is located at a side portion of a seat cushion thereof. In the seat belt device of the present invention, when a person gets on or off the rear seat, such securing point of the seat belt can be shifted to a location not to interrupt the getting on and off.

In a motor vehicle having two doors in which the getting on and off the rear seat is executed by shifting the front seat frontwards, an opening for the door tends to be widened in order that the getting on and off the rear seat can be readily effected.

As shown in FIG. 1, the motor vehicle as referred to above is generally provided with a seat belt 55 having one end wound up in an emergency locking retractor 56, an intermediate portion supported by a lap anchor 57 and the other end fixedly mounted on a seat belt anchor 58 for functioning as the securing point of the seat belt on the side of the vehicle body. In such seat belt device, the seat belt anchor 58 is required to be provided at a location near the front seat 51 so that the seat belt device may ensure a certain holding force and the seat belt 55 may be readily mounted or dismounted. Accordingly, in the case where an opening portion D is widened, since a portion of the seat belt 55 passed between the lap anchor 57 and seat belt anchor 58 crosses substantially vertically in the opening portion D, the portion of the seat belt 55 occasionally undesirably catches a foot of the person who is about to get on or off the rear seat.

A seat belt device having a movable seat belt anchor has recently been developed to solve the above described problem and is disclosed, for example, in the Japanese Utility Model Laid-Open Application (Jikkaisho) No. 58-35443. More specifically, as shown in FIG. 2, such seat belt anchor 58 is freely reciprocably mounted on an anchor rail 59 extending in the longitudinal direction of the vehicle body. In the case where a person who sits on the front seat 51 puts on the seat belt 55, he is requested to draw it towards him to move the seat belt anchor 58 frontwards. On the other hand, in the case where a person gets on or off the rear seat, it is necessary for him to push or pull the seat belt 55 backwards to transfer the seat belt anchor 58.

In the aforementioned seat belt device, since the seat belt anchor 58 is disposed reciprocably in the longitudinal direction of the vehicle body, it can be transferred backwards so that a portion of the seat belt 55 passed between the lap anchor 57 and seat belt anchor 58 may be retreated backwards beyond the rear end of the opening portion D, thus resulting in that the getting on and off the rear seat is facilitated to some extent. In this kind of the seat belt device, however, since the seat belt anchor 58 is transferred backwards by holding the seat belt 55 extending between the lap anchor 57 and seat belt anchor 58, the seat belt anchor 58 can not always be transferred backwards. Accordingly, the seat belt 55 occasionally undesirably exists in his way to or from the rear seat and the person who is about to get on or off the rear seat is subject to a problem such that his foot occasionally gets caught in the seat belt 55.

SUMMARY OF THE INVENTION

Accordingly, the present invention has been developed with a view to substantially eliminating the above described disadvantage inherent in the prior art seat belt device, and has for its essential object to provide an improved seat belt device for use in a motor vehicle, in which the getting on and off a rear seat can be readily executed after a securing point where the seat belt is secured to the vehicle body has been transferred backwards through a simple operation so that the seat belt for the front seat may not disturb the getting on and off the rear seat.

Another important object of the present invention is to provide a seat belt device of the above described type which is simple in construction and stable in functioning, and can be readily manufactured at low cost.

In accomplishing these and other objects, the present invention has been developed in view of the fact that the aforegoing conventional motor vehicle is provided with an operating member for operating a walk-in mechanism or the like to shift the front seat frontwards and when a person gets on or off the rear seat, the operating member is inevitably operated to shift the front seat frontwards. Moreover, it has been confirmed that the securing point on the side of the vehicle body, such as a seat belt anchor or the like, can be transferred backwards so that the seat belt may not disturb the getting on and off the rear seat, by enabling such securing point to move backwards in association with the operation of the operating member.

According to one preferred embodiment of the present invention, there is provided a seat belt device for use in a motor vehicle which internally accommodates front and rear seats and in which the getting on and off the rear seat is executed after the front seat has been shifted frontwards through operation of an operating means disposed on the front seat to shift the front seat back and forth, with a securing point where the seat belt is secured to the vehicle body being provided at the side portion of a seat cushion of the front seat, the aforementioned seat belt device being characterized in that the securing point of the seat belt is disposed freely reciprocably in the longitudinal direction of the motor vehicle so as to be shifted backwards in association with the operation of the operating means.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENT

Figure 1:
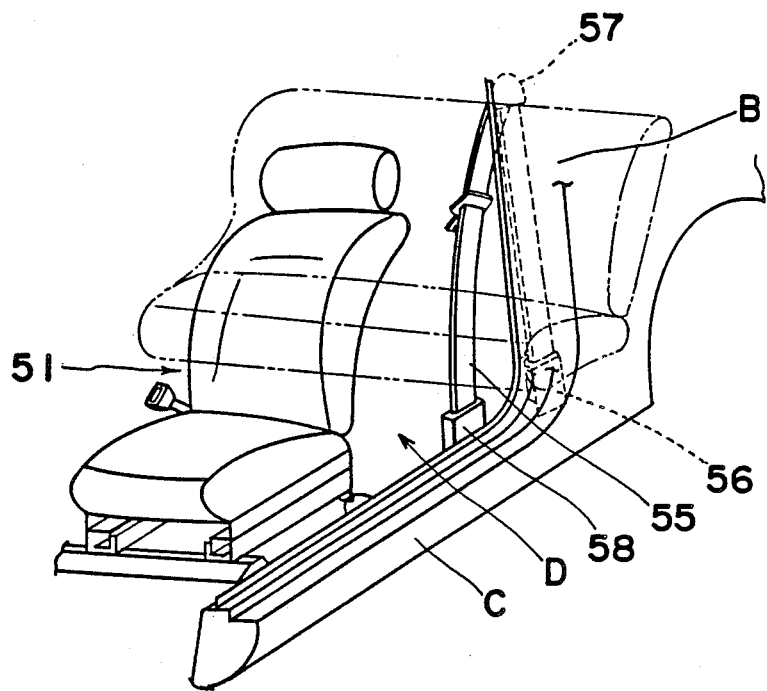
FIG. 1 is a fragmentary perspective view of a motor vehicle having a conventional seat belt device (already referred to)
Figure 2:
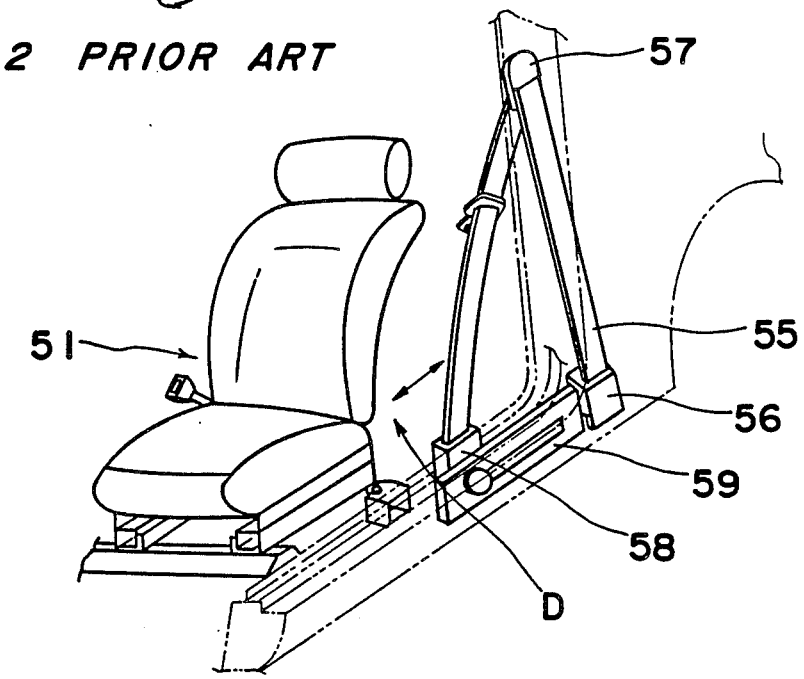
FIG. 2 is a view similar to FIG. 1, of a motor vehicle having another conventional seat belt device (already referred to)
Figure 3:
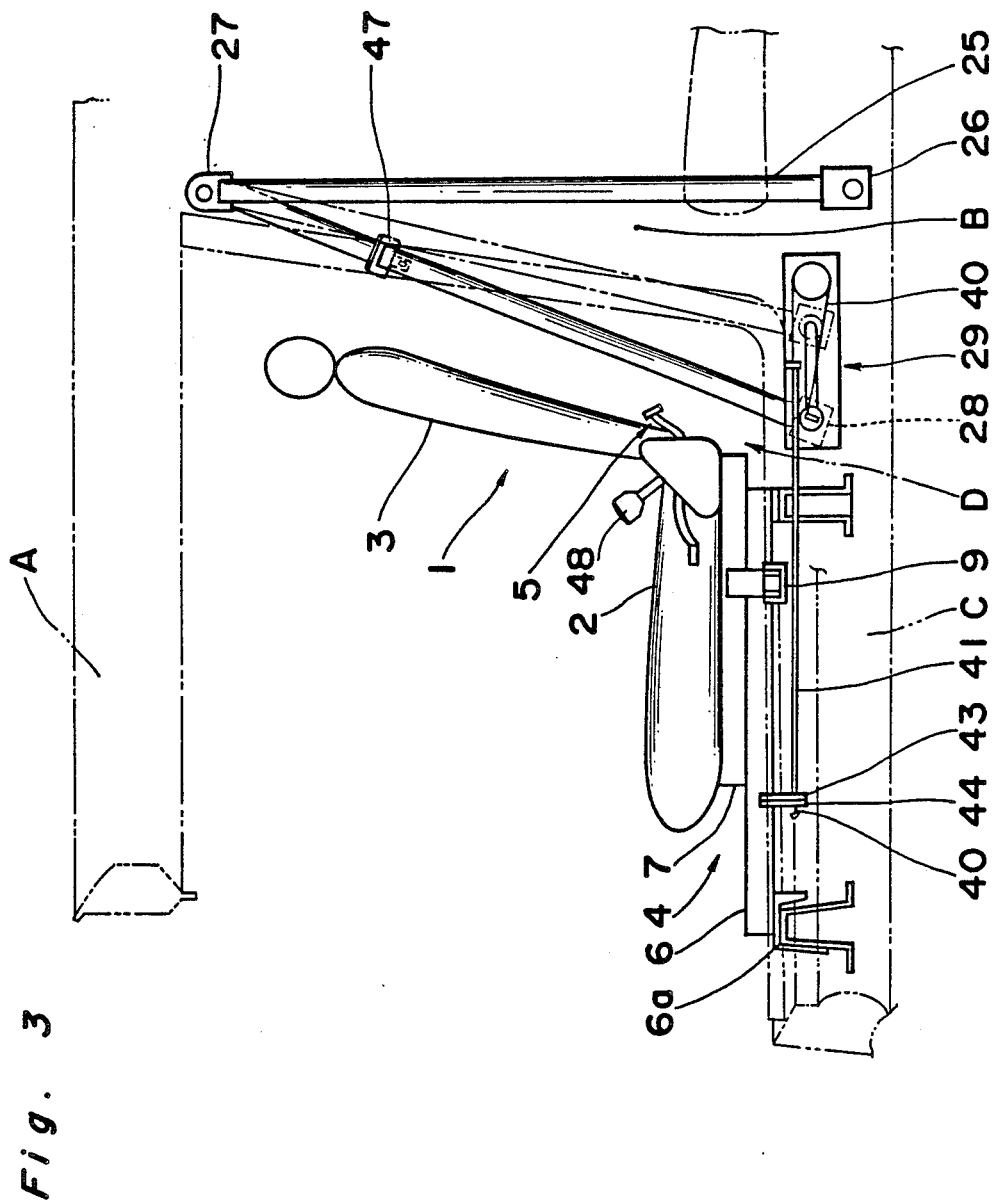
FIG. 3 is a fragmentary perspective side elevational view of a motor vehicle having a seat belt device of the present invention.
Figure 4:
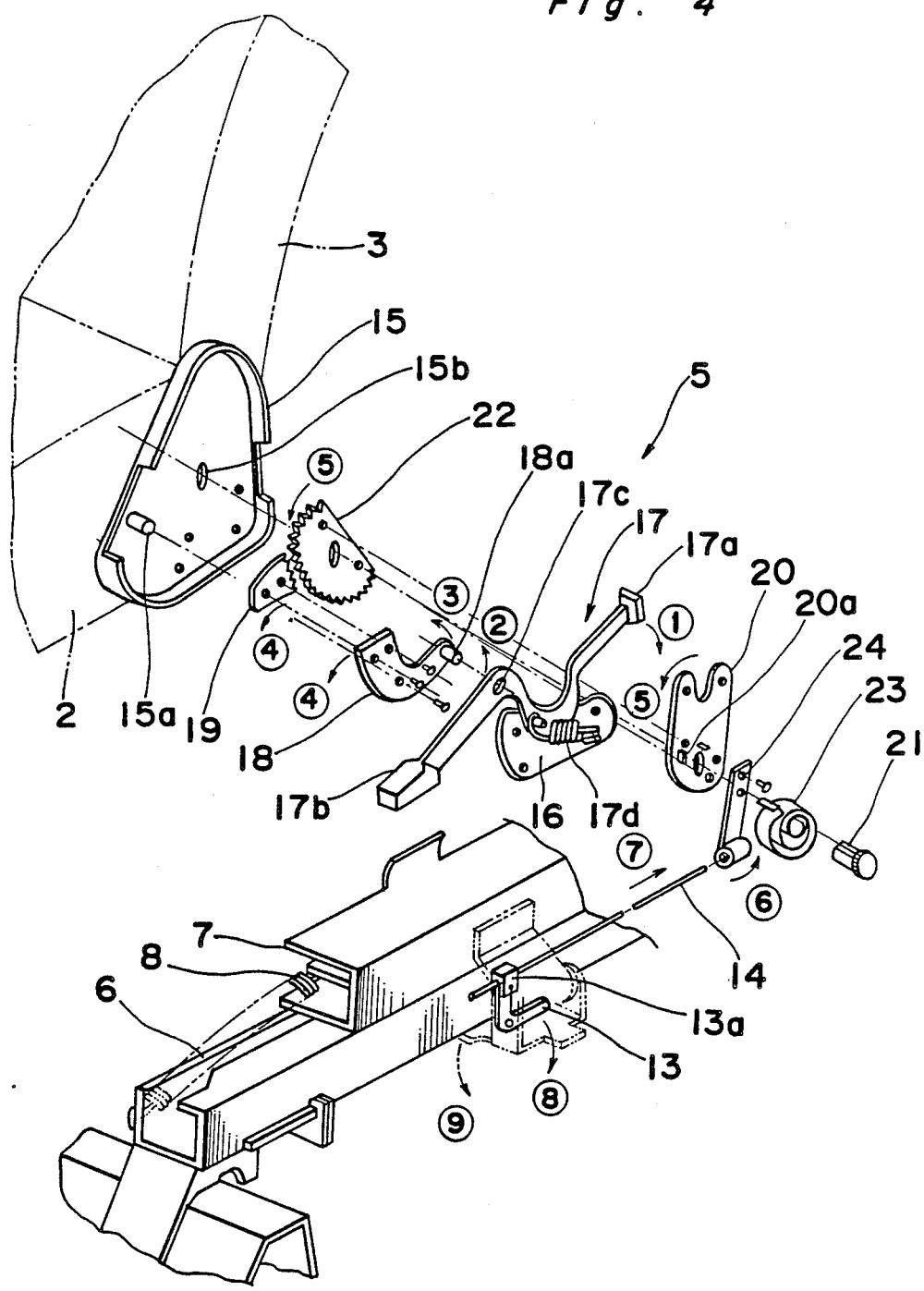
FIG. 4 is an exploded perspective view, on an enlarged scale, of an operating portion of a walk-in mechanism employed in the seat belt device of FIG. 3.
Figure 5:
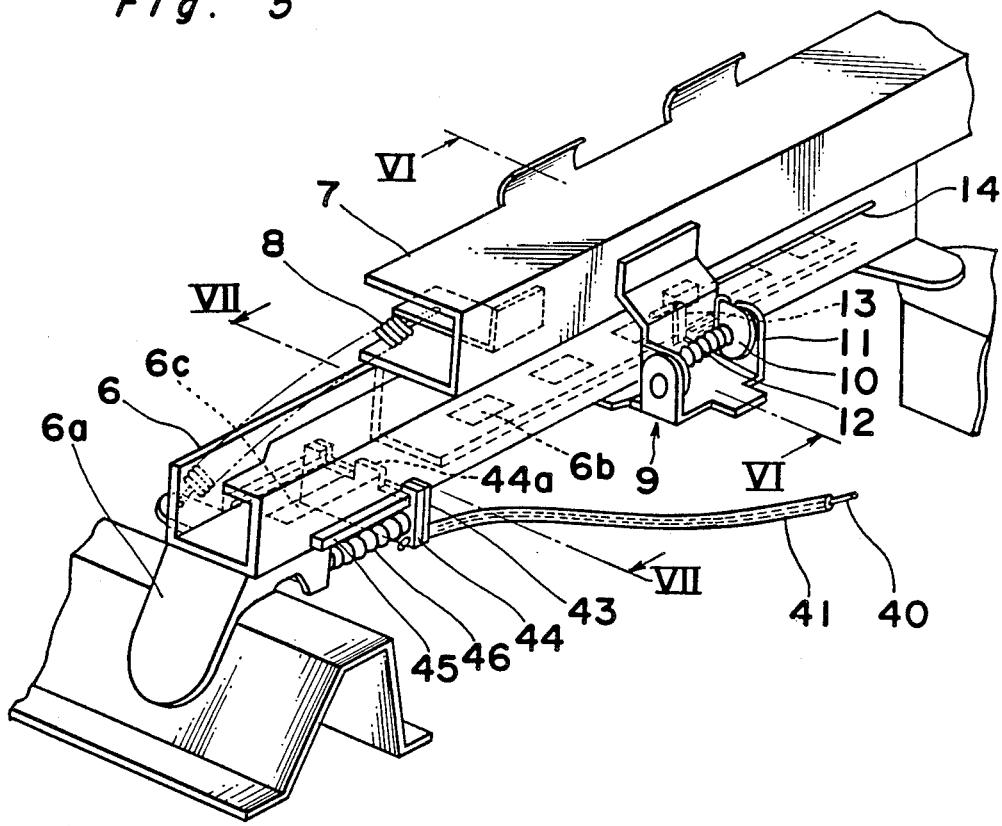
FIG. 5 is a fragmentary perspective view of a slide portion of the walk-in mechanism of FIG. 4.
Figure 6:
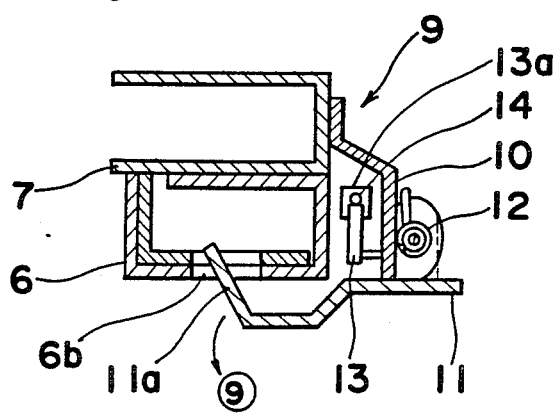
FIG. 6 is a section taken along the line VI—VI in FIG. 5.
Figure 7:
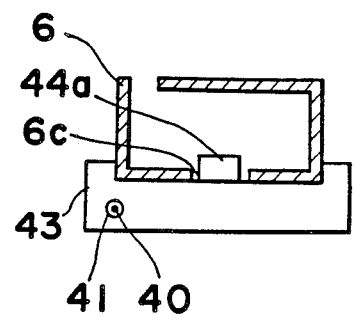
FIG. 7 is a section taken along the line VII—VII in FIG. 5.

Referring first to FIGS. 3 and 4, there is shown in FIG. 3, a front seat which includes a seat cushion 2 disposed on a slide section 4 of a walk-in mechanism and a seat back 3 coupled to the seat cushion 2 through an operating portion 5 of the walk-in mechanism on the side of the door and through a hinge (not shown) on its opposite side. FIG. 3 illustrates the front seat 1 and its various attachments as viewed from the side of the door.

The slide section 4 of the walk-in mechanism guides the front seat 1 freely movably in the longitudinal direction of the motor vehicle and is provided with a couple of longitudinally extending spaced lower rails 6 securely mounted on a floor plate by way of brackets 6a and a couple of upper rails 7 disposed freely movably on and along the lower rails 6, with the seat cushion 2 being securely supported by the upper rails 7. There are also provided on each pair of the upper and lower rails 7 and 6, a return spring 8 for biasing the upper rail 7 frontwards and a slide lock 9 for locking the upper rail 7 at a desired position.

As shown in FIGS. 3 through 6, the slide lock 9 includes a lock bracket 10 rigidly secured on a side portion of the upper rail 7, a lock plate 11 rotatably mounted on the lock bracket 10 and a coil spring 12 disposed between the lock bracket 10 and the lock plate 11 to bias the forward end of the lock plate 11 upwards. The lock plate 11 has a lock finger 11a at its forward end to thereby lock the upper rail 7 upon engagement thereof into one of lock finger receiving openings 6b defined at the lower portion of the lower rail 6, since the lock plate 11 is biased upwards by means of the coil spring 12. An L-shaped lock release lever 13 is rotatably mounted on the lock bracket 10 and hingedly connected to a lock release link 14 by way of a hinge joint 13a disposed at the upper end of the lever 13. Accordingly, when the lock release link 14 is caused to move in a direction shown by an arrow (7) in FIG. 4, the lock release lever 13 is rotated in a direction shown by an arrow (8) and comes into collision, at its lower end, with the lock plate 11 to rotate it in a direction shown by an arrow (9). As a result, since the lock finger 11a is disengaged from the lock finger receiving opening 6b of the lower rail 6, the upper rail 7 is caused to move frontwards by the return spring 8.

The operating portion 5 of the walk-in mechanism is constituted as shown in FIG. 4 not only to rotate the seat back 3 frontwards or backwards but to operate the slide lock 9. More specifically, a seat cushion bracket 15 is rigidly secured on the seat cushion 2 at the rearward side portion thereof and an operating lever 17 is rotatably supported on the seat cushion bracket 15 through a mounting plate 16. The operating lever 17 has one end as a foot bar 17a and the other end as a hand bar 17b defining an elongated opening 17c which engages with a pin 18a provided on one end of an L-shaped lever 18. The foot bar 17a of the operating lever 17 is biased in a direction opposite to the direction shown by an arrow (1) by means of a foot bar return spring 17d having one end connected thereto and the other end connected to the mounting plate 16. A pawl gear 19 is securely mounted on the other end of the L-shaped lever 18 which is mounted on the seat cushion bracket 15 so as to be rotatable around a projection 15a formed thereon.

On the other hand, at the lower side portion of the seat back 3 is disposed a seat back bracket 20 having one end connected thereto and the other end rotatably supported by a fixed shaft 21 which is secured on the seat cushion bracket 15 upon engagement with an opening 15b defined therein. A sector gear 22 is fixedly mounted on and coaxially aligned with the other end of the seat back bracket 20 so as to mesh with the pawl gear 19. A seat back return spring 23 of a spiral type which biases the seat back bracket 20 to incline forwards, is secured at its one end to the fixed shaft 21 and connected at its other end to a projection 20a formed on the seat back bracket 20. A lock release operating plate 24 to be coupled to the lock release link 14 is securely mounted on the other end of the seat back bracket 20.

Accordingly, when the foot bar 17a of the operating lever 17 is caused to move in the direction shown by the arrow (1), the elongated opening 17c defined in the hand bar 17b rotates in the direction shown by the arrow (2) and the pin 18a of the L-shaped lever 18, therefore, rotates in the direction shown by the arrow (3). In this event, the pawl gear 19 provided on the other end of the L-shaped lever 18 moves in the direction shown by the arrow (4) to disengages from the sector gear 22. As a result, both of the sector gear 22 and seat back bracket 20 is caused to rotate in the direction shown by the arrow (5) under the influence of a biasing force by the seat back return spring 23. The seat back 3 is, therefore, caused to incline forwards in a direction shown by the arrow (5). Furthermore, when the seat back bracket 20 is rotated in the direction shown by the arrow (5), the lock release operating plate 24 rotates in the direction shown by the arrow (6) so that the lock release link 14 may move in the direction shown by the arrow (7).

On the other hand, when the foot bar 17a is unloaded, it is caused to rotate in the direction opposite to the direction shown by the arrow (1) by the foot bar return spring 17d so that the pawl gear 19 may be rotated in the direction opposite to the direction shown by the arrow (4). Consequently, the pawl gear 19 engages with the sector gear 22 to suspend the rotation of the sector gear 22 i.e., the rotation of the seat back bracket 20 in order that the seat back 3 is kept in its forwards inclined position.

In the meantime, as shown in FIG. 3, there are disposed a roof rail A at the upper portion of the motor vehicle, a side sill C on each side of the lower portion thereof and a center pillar B rigidly secured between the roof rail A and each side sill C, with an opening D for the door being defined by the roof rail A, side sill C and center pillar B. An emergency locking retractor (referred to as ELR hereinafter) 26 is fixedly mounted at the lower portion of the center pillar B and a lap anchor 27 is provided in the vicinity of the connecting portion between the roof rail A and center pillar B. Moreover, a seat belt anchor 28 is reciprocably disposed on an anchor rail device 29 provided on the side sill C located at the side portion of the seat cushion 2, while a seat belt 25 for the front seat having one end securely connected to the seat belt anchor 28 and the other end wound up in the ELR 26 is passed therebetween by way of the lap anchor 27. A latch or tongue 47 is freely movably mounted on the seat belt 25 extending between the lap anchor 27 and seat belt anchor 28, and a latch release or buckle 48 is secured at the side portion of the seat cushion 2 on the opposite side of the operating portion 5 of the walk-in mechanism. The latch 47 is engaged with the latch release 48 to ensure the safety of a person who sits on the front seat 1 and disengaged therefrom when he wishes to relax or to get off the front seat 1.

Figure 8:
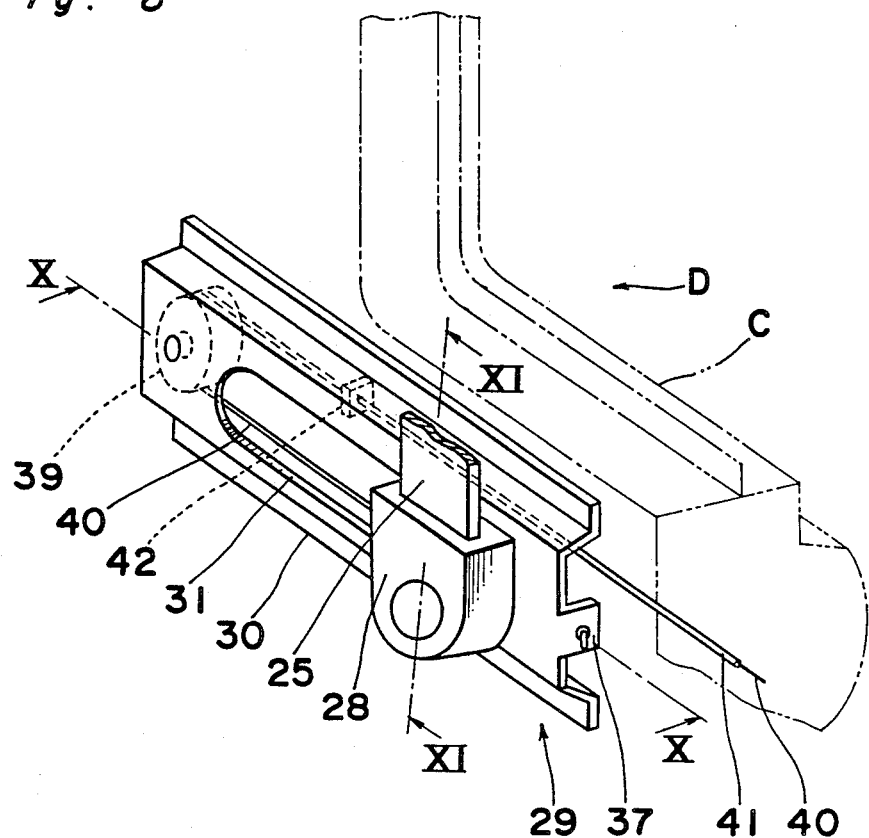
FIG. 8 is a fragmentary perspective view, on an enlarged scale, of an anchor rail device shown in FIG. 3, as viewed from outside.
Figure 9:
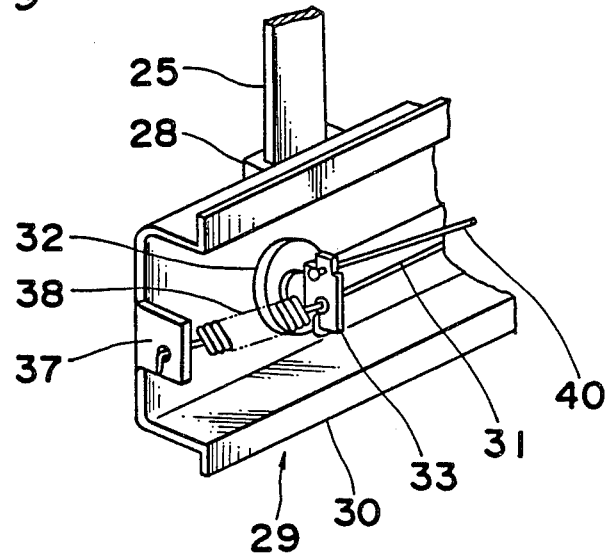
FIG. 9 is a fragmentary perspective view, on an enlarged scale, of a main portion of the anchor rail device of FIG. 8, as viewed from inside.
Figure 10:
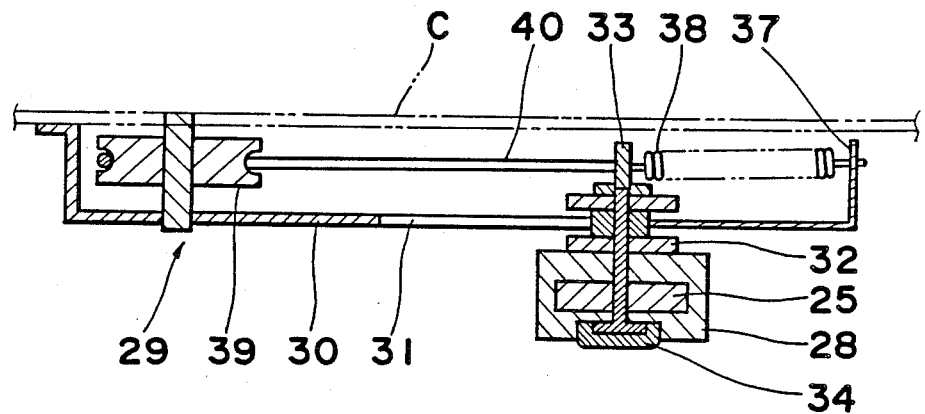
FIG. 10 is a section taken along the line X—X in FIG. 8.
Figure 11:
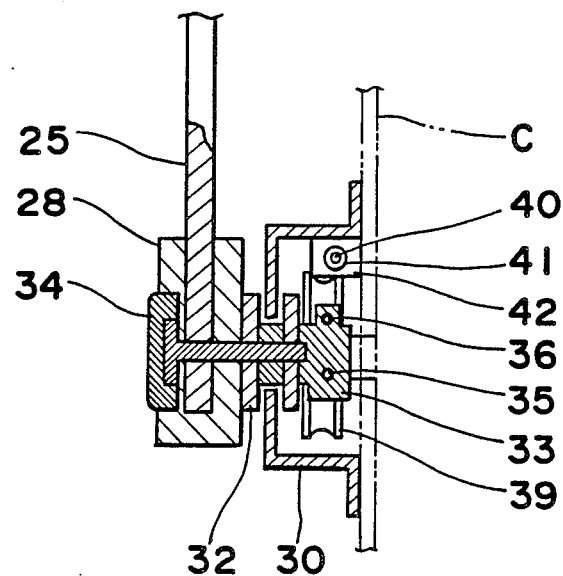
FIG. 11 is a section taken along the line XI—XI in FIG. 8.

As shown in FIGS. 3, 8 and 11, the anchor rail device 29 includes an anchor rail frame 30 having a cross section generally in the form of a figure "U" and secured to the side sill C so as to extend rearwards beyond the rear end of the opening portion D of the motor vehicle. An elongated opening of an anchor rail portion 31 is defined similarly beyond the rear end of the opening portion D and a reciprocable member 32 of the seat belt anchor 23 is disposed reciprocably in and along the elongated opening of the anchor rail portion 31. The reciprocable member 32 is secured, integrally together with a combination of two kinds of disc-like members having different diameters, to the seat belt anchor 28 through a bolt 34 bolted onto an anchor operation plate 33 which defines a first opening 35 for receiving one end of an anchor return spring 38 and a second opening 36 for receiving a wire 40. Preferably, the first and second openings 35 and 36 of the anchor operation plate 33 are aligned on the same line.

The anchor return spring 38 is connected at its one end to the anchor operation plate 33 and at its other end to an anchor return spring mounting plate 37 provided at the forward end of the anchor rail frame 30.

The wire 40 connected at its one end to the anchor operation plate 33 is turned around a pulley 39 disposed at the rear end of the anchor rail frame 30 and extends inside a hollow cable 41 so that the other end of the wire 40 may be connected to a slide plate 44. Accordingly, the anchor operation plate 33 is urged frontwards by the anchor return spring 38 and backwards by the wire 40. The hollow cable 41 is coupled at its opposite ends to a first hollow cable mounting plate 42 fixedly mounted on the anchor rail frame 30 and to a second hollow cable mounting plate 43 fixedly mounted at the lower portion of the lower rail 6 and effecting as a retreat stopper of the slide plate 44.

The slide plate 44 is guided by and movable along a couple of guide rails 45 disposed on each side of the forward portion of the lower rail 6 and is urged towards the second hollow cable mounting plate 43 by a retreat compression spring 46 disposed between it and the bracket 6a of the lower rail 6. Furthermore, a protruding portion 44a is formed at the upper edge portion of the slide plate 44 and inserted into an elongated opening 6c defined at the forward lower portion of the lower rail 6 so as to be capable of contacting with the forward end of the upper rail 7. Accordingly, when the upper rail 7 is caused to slide forwards, the slide plate 44 is also caused to move forwards so that the wire 40 may be pulled in the same direction. More specifically, the slide plate 44 is caused to move forwards upon contact of its protruding portion 44a with the forward end of the upper rail 7, when the upper rail 7 is caused to move forwards. The wire 40 connected at its one end to the slide plate 44 is, therefore, pulled forwards and the anchor operation plate 33 connected to the other end thereof is caused to move backwards, together with the seat belt anchor 28. Moreover, in the case where the upper rail 44 is caused to move backwards, the slide plate 44 is transferred backwards by the retreat spring 46 so that the wire 40 may be relaxed. As a result, the seat belt anchor 28 is caused to move forwards by the anchor return spring 38.

By the above described construction of this embodiment, in the case where a person gets on or off a rear seat, when the foot bar 17a of the operating portion 5 of the walk-in mechanism is operated in the direction shown by the arrow (1) in FIG. 4, the pawl gear 19 is rotated in the direction shown by the arrow (4) as described hereinbefore, so as to disengage from the sector gear 22. The seat back bracket 20 is rotated in the direction shown by the arrow (5) by the seat back return spring 23 so that the seat back 3 may be inclined forwards.

Meanwhile, as shown in FIG. 4, when the seat back bracket 20 is rotated in the direction shown by the arrow (5), the lock release operation plate 24 is caused to rotate in the direction shown by the arrow (6) and the lock release lever 13 is, then, rotated in the direction shown by the arrow (8) through the lock release link 14 to strike the lock plate 11. In this event, the lock plate 11 is rotated in the direction shown by the arrow (9) so that the lock finger 11a may be disengaged from the lock finger receiving opening 6b defined in the lower rail 6. Consequently, the upper rail 7 is caused to move forwards under the influence of the biasing force of the return spring 8. In other words, since the front seat 1 is inclined forwards and the opening portion D on the side of the rear seat is widely opened, the opening required for the getting on and off the rear seat is desirably ensured.

When the upper rail 7 is transferred forwards, the slide plate 44 along with one end of the wire 40 is caused to move forwards, thus resulting in that the other end of the wire 40 connected to the anchor operation plate 33 through the pulley 39 is drawn backwards. That is to say, the anchor operation plate 33 is pulled backwards so that the seat belt anchor 28 may be transferred backwards beyond the rear end of the opening portion D.

As described so far, in the case where a person gets on or off the rear seat, the front seat 1 is moved forwards so that the opening required for the getting on and off on the side of the rear seat is desirably ensured, and moreover, the seat belt anchor 28 is caused to move backwards beyond the opening portion D so that the seat belt 25 may not interfere the getting on and off. Accordingly, the getting on and off the rear seat can be executed smoothly. Furthermore, the backward movement of the seat belt anchor 28 is positively conducted simultaneously with the operation of the operating portion 5 of the walk-in mechanism.

In the case where a person gets on the front seat 1, since the slide lock 9 has been released and the upper rail 7 has been drawn forwards by the return spring 8, the person who is about to get on the front seat 1 is requested to push it backwards. After the front seat 1 has been shifted backwards to a desired position and when the hand bar 17b of the operating portion 5 of the walk-in mechanism is rotated upwards, the L-shaped lever 18 is caused to rotate in the direction shown by the arrow (3) so that the pawl gear 19 may be disengaged from the sector gear 22. At this moment, when the seat back 3 is raised at a desired angle and the front seat 1 is moved back and forth, with the hand bar 17b being released, the lock finger 11a of the lock plate 11 is inserted into one of the lock finger receiving openings 6b of the lower rail 6 and the front seat 1 is brought to a stop at a desired position. More specifically, the lock release operation plate 24 is rotated in the direction opposite to the direction shown by the arrow (5) in FIG. 4, by raising the seat back 3 at a desired angle, and the lock release lever 13 is, therefore, rotated in the direction opposite to the direction shown by the arrow (8) by way of the lock release link 14. Accordingly, since the engagement between the lock release lever 13 and lock plate 11 is released, the lock plate 11 is urged upwards by the coil spring 12. In this event, although the lock finger 11a is not always inserted into one of the lock finger receiving openings 6b of the lower rail 6 and occasionally contacts with the lower surface thereof, the lock finger 11a can be inserted into one of the lock finger receiving openings 6b without fail, simply by moving the front seat 1 slightly frontwards or backwards.

When the front seat 1 is moved backwards, the retreat spring 46 effects the slide plate 44 to move backwards and a tension exerting on the wire 40 is released, thus resulting in that the anchor operation plate 33 connected to the other end thereof is caused to move forwards under the influence of the biasing force of the anchor return spring 38. That is to say, the seat belt anchor 28 is transferred frontwards to return to its initial position. Accordingly, the person who gets on the front seat is able to readily put on the seat belt 55.

As described so far, when a person gets on the front seat 1, it is initially moved backwards and the seat belt anchor 28 automatically and steadily returns its former position in association with the action such that the seat back 3 is set at a desired angle.

It is to be noted here that in this embodiment, although the movement of the front seat is transmitted to the seat belt anchor by the combination of a wire, a plurality of springs and the like, it may be transmitted by the combination of a rack and pinion mechanism or the like.

It should be further noted that the seat belt anchor 28 may be transferred by means of a driving motor, with a switch for operating the driving motor being incorporated in the slide portion 4 of the walk-in mechanism or in the operating portion 5 thereof.

According to the seat belt device of the present invention, in the case where a person gets on or off the rear seat, since a point where the seat belt is secured to the vehicle body is shifted backwards in association with the operation of the operating member of the front seat, the person who gets on or off the rear seat is not required to transfer the seat belt backwards as in the conventional case. Furthermore, the fact that such securing point of the seat belt is shifted backwards enables a person to readily ride in or out a motor vehicle, because the seat belt is caused to retreat backwards and therefore, never stand in his way to or from the rear seat. As a result, the readiness in riding in and out has been remarkably improved, with the motor vehicle defining a wide opening portion on each side thereof.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A seat belt device for use in a motor vehicle which is internally provided with front and rear seats and in which the getting on and off the rear seat is executed after the front seat has been shifted frontwards through operation of an operating means disposed on the front seat to shift the front seat back and forth, with a securing point where the seat belt is secured to the vehicle body being provided at the side portion of a seat cushion of the front seat, each side portion of the vehicle body being provided with an opening beside the front seat to permit getting in and out therethrough, said seat belt device comprising:
    a first means for shifting said securing point of the seat belt back and forth between a front position and a rear position;
    a second means for actuating said first means in response to the operation of said operating means;
    said first means being actuated by said second means to shift said securing point of the seat belt backwards in response to the forward movement of the front seat by the operating means;
    said seat belt extending away from the securing point and crossing the opening of the vehicle body when the securing point is located at its front position and extending along a peripheral portion of the opening of the vehicle body when the securing point is located at its rear position.

2. A seat belt device as claimed in claim 1, wherein said securing point of the seat belt is disposed immediately below said opening.

3. A seat belt device as claimed in claim 2, wherein the lower portion of the vehicle body immediately below said opening is composed of a side sill.

4. A seat belt device as claimed in claim 1, wherein the seat belt is securely connected at its one end to said securing point of the vehicle body and wound up at its other end in a winding means, and a latch member and a lap anchor are provided on the seat belt extending between said securing point and winding means respectively on the side of said securing point and on the side of said winding means, said lap anchor being fixedly mounted at the upper portion of the vehicle body to support and guide the seat belt freely movably therein, with a latch release member for engaging with and disengaging from said latch member being disposed at the side portion of said seat cushion on the opposite side of said securing point of the seat belt.

5. A seat belt device as claimed in claim 4, wherein said opening of the vehicle body is defined by a roof rail disposed at the upper portion of the vehicle body, a side sill disposed at the lower portion thereof and a center pillar connecting said roof rail and side sill to each other on the rear of said opening, said securing point of the seat belt being provided on said side sill and said lap anchor being fixedly mounted on the vehicle body in the vicinity of a connecting portion between said roof rail and side sill.

6. A seat belt device as claimed in claim 5, the seat belt extending between said securing point and lap anchor crosses said opening of the vehicle body or extends along said center pillar when said securing point is shifted respectively frontwards or backwards.

7. A seat belt device as claimed in claim 1, wherein said operating means comprises an operating lever and slide rails extending in the longitudinal direction of the motor vehicle.

8. A seat belt device as claimed in claim 7, wherein said second means comprises a wire having one end connected to the front seat and the other end connected to said securing point.

9. A seat belt device as claimed in claim 8, wherein said first means comprises a rail member for supporting said securing point movably in the longitudinal direction of the motor vehicle and said second means comprises a pulley located at the rear portion of said rail member and a wire turned round said pulley, and when the front seat has been shifted frontwards, one end of said wire is drawn forwards to thereby transfer the other end thereof backwards so that said securing point may be shifted backwards.

10. A seat belt device as claimed in claim 9, wherein said slide rails comprise a couple of spaced lower rails rigidly secured on the vehicle body and a couple of spaced upper rails for supporting the seat cushion and mounted reciprocably on and along said lower rails, and a slide member is supported reciprocably in the vicinity of the front end of one of said lower rails, said wire being connected at its one end to said slide member and movable inside a hollow cable connected at its one end to said lower rail on the rear side of said slide member, and when said upper rail has been caused to slide forwards on and along said lower rail to be brought at its front end into contact with said slide member, said slide member is transferred frontwards to draw said wire.

11. A seat belt device for use in a motor vehicle which is internally provided with front and rear seats and in which the getting on and off the rear seat is executed after the front seat has been shifted frontwards through operation of an operating means disposed on the front seat to shift the front seat back and forth, with a securing point where the seat belt is secured to the vehicle body being provided at the side portion of a seat cushion of the front seat, each side portion of the vehicle body being provided with an opening beside the front seat to permit getting in and out therethrough, said securing point being disposed substantially below said opening, said seat belt device comprising:

a first means for shifting said securing point of the seat belt back and forth;

a second means for actuating said first means in response to the operation of said operating means;

said first means comprising a rail member for slidably supporting the securing point so as to be slidable in a direction longitudinally of the vehicle body.

12. A seat belt device as claimed in claim 11, wherein the lower portion of the vehicle body immediately below said opening is comprised of a side sill.

13. A seat belt device as claimed in claim 11, wherein the seat belt is securely connected at its one end to said securing point of the vehicle body and wound up at its other end in a winding means, and a latch member and a lap anchor are provided on the seat belt extending between said securing point and winding means respectively on the side of said securing point and on the side of said winding means, said lap anchor being fixedly mounted at the upper portion of the vehicle body to support and guide the seat belt freely movable therein, with a latch release member for engaging with and disengaging from said latch member being disposed at the side portion of said seat cushion on the opposite side of said securing point of the seat belt.

14. A seat belt device as claimed in claim 13, wherein said opening of the vehicle body is defined by a roof rail disposed at the upper portion of the vehicle body, a side sill disposed at the lower portion thereof and a center pillar connecting said roof rail and side sill to each other on the rear of said opening, said securing point of the seat belt being provided on said side sill and said lap anchor being fixedly mounted on the vehicle body in the vicinity of a connecting portion between said roof rail and side sill.

15. A seat belt device as claimed in claim 14, the seat belt extending between said securing point and lap anchor crosses said opening of the vehicle body or extends along said center pillar when said securing point is shifted respectively frontwards or backwards.

16. A seat belt device as claimed in claim 11, wherein said first means is actuated by said second means to shift said securing point of the seat belt backwards in association with the forward movement of the front seat by said operating means.

17. A seat belt device as claimed in claim 11, wherein said operating means comprises an operating lever and slide rails extending in the longitudinal direction of the motor vehicle.

* * * * *